(12) United States Patent
Ramsey et al.

(10) Patent No.: US 7,214,442 B2
(45) Date of Patent: May 8, 2007

(54) HIGH SPECIFIC POWER, DIRECT METHANOL FUEL CELL STACK

(75) Inventors: John C. Ramsey, Los Alamos, NM (US); Mahlon S. Wilson, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 484 days.

(21) Appl. No.: 10/871,295

(22) Filed: Jun. 17, 2004

(65) Prior Publication Data

US 2005/0118491 A1    Jun. 2, 2005

Related U.S. Application Data

(60) Provisional application No. 60/526,250, filed on Dec. 2, 2003.

(51) Int. Cl.
  *H01M 2/14*   (2006.01)
  *H01M 4/00*   (2006.01)
(52) U.S. Cl. ............... 429/39; 429/41; 429/44
(58) Field of Classification Search .................. 429/32, 429/39, 44, 35, 37, 41
  See application file for complete search history.

(56) References Cited

U.S. PATENT DOCUMENTS

| | | | |
|---|---|---|---|
| 4,310,605 A | 1/1982 | Early et al. .................. | 429/18 |
| 6,071,635 A | 6/2000 | Carlstrom, Jr. .............. | 429/34 |
| 6,309,773 B1 | 10/2001 | Rock .......................... | 429/34 |
| 6,623,882 B2 | 9/2003 | Yang ........................... | 429/39 |
| 6,635,378 B1 * | 10/2003 | Yang et al. ................... | 429/34 |
| 6,663,994 B1 | 12/2003 | Fly et al. ...................... | 429/30 |
| 6,663,997 B2 | 12/2003 | Dong et al. ................... | 429/39 |
| 6,677,071 B2 | 1/2004 | Yang ........................... | 429/34 |
| 6,864,004 B2 * | 3/2005 | Wilson et al. ................. | 429/32 |

* cited by examiner

*Primary Examiner*—Patrick Joseph Ryan
*Assistant Examiner*—Thomas H. Parsons
(74) *Attorney, Agent, or Firm*—Mark N. Fitzgerald; Holly L. Teeter

(57) ABSTRACT

The present invention is a fuel cell stack including at least one direct methanol fuel cell. A cathode manifold is used to convey ambient air to each fuel cell, and an anode manifold is used to convey liquid methanol fuel to each fuel cell. Tie-bolt penetrations and tie-bolts are spaced evenly around the perimeter to hold the fuel cell stack together. Each fuel cell uses two graphite-based plates. One plate includes a cathode active area that is defined by serpentine channels connecting the inlet manifold with an integral flow restrictor to the outlet manifold. The other plate includes an anode active area defined by serpentine channels connecting the inlet and outlet of the anode manifold. Located between the two plates is the fuel cell active region.

27 Claims, 9 Drawing Sheets

HIGH SPECIFIC POWER, DIRECT METHANOL FUEL CELL STACK

RELATED APPLICATIONS

This application claims the benefit of provisional application No. 60/526,250 filed on Dec. 2, 2003, titled "High Power Density Direct Methanol Fuel Cell Stack Design".

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to fuel cell stacks, and, more particularly, to cumulative fuel cell stack improvements yielding improved performance characteristics.

BACKGROUND OF THE INVENTION

There is significant and increasing interest in utilizing direct methanol fuel cells (DMFCs) for portable power applications. Currently, most attention is focused on DMFC sub-watt power systems that are relatively simple. However, more sophisticated systems, providing more than several watts of power, can provide higher power densities. Stack designs for such systems mirror conventional hydrogen fuel cell approaches, i.e., multiple bipolar plates aligned in series with internal manifolds for reactant delivery and removal. However, certain features differentiate the stack design of this invention from its hydrogen and methanol predecessors. Some features provide improved performance and stability for operation with dilute liquid methanol feed and non-humidified reactant air, low reactant pressure and low air-supply stoichiometry. Other features improve ease of fabrication, durability of the components, uniformity of cell operation within the stack, and enable reduction in stack size and weight.

SUMMARY OF THE INVENTION

In accordance with the purposes of the present invention, as embodied and broadly described herein, the present invention is a fuel cell stack including at least one direct methanol fuel cell. A cathode manifold is used to convey ambient air to each fuel cell, and an anode manifold is used to convey liquid methanol fuel to each fuel cell. Tie-bolt penetrations and tie-bolts are spaced evenly around the perimeter to hold the fuel cell stack together. Each fuel cell uses two graphite-based plates. One plate includes a cathode active area that is defined by serpentine channels connecting the inlet manifold with an integral flow restrictor to the outlet manifold. The other plate includes an anode active area defined by serpentine channels connecting the inlet and outlet of the anode manifold. Located between the two plates is the fuel cell active region.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Fuel cell developers continue to provide new and innovative designs for fuel cells. The fuel cell and fuel cell stack embodiments according to the present invention take another step in reducing the fuel cell footprint, reducing the fuel cell stack volume, and increasing fuel cell and fuel cell stack power output and power density.

Figure 1:
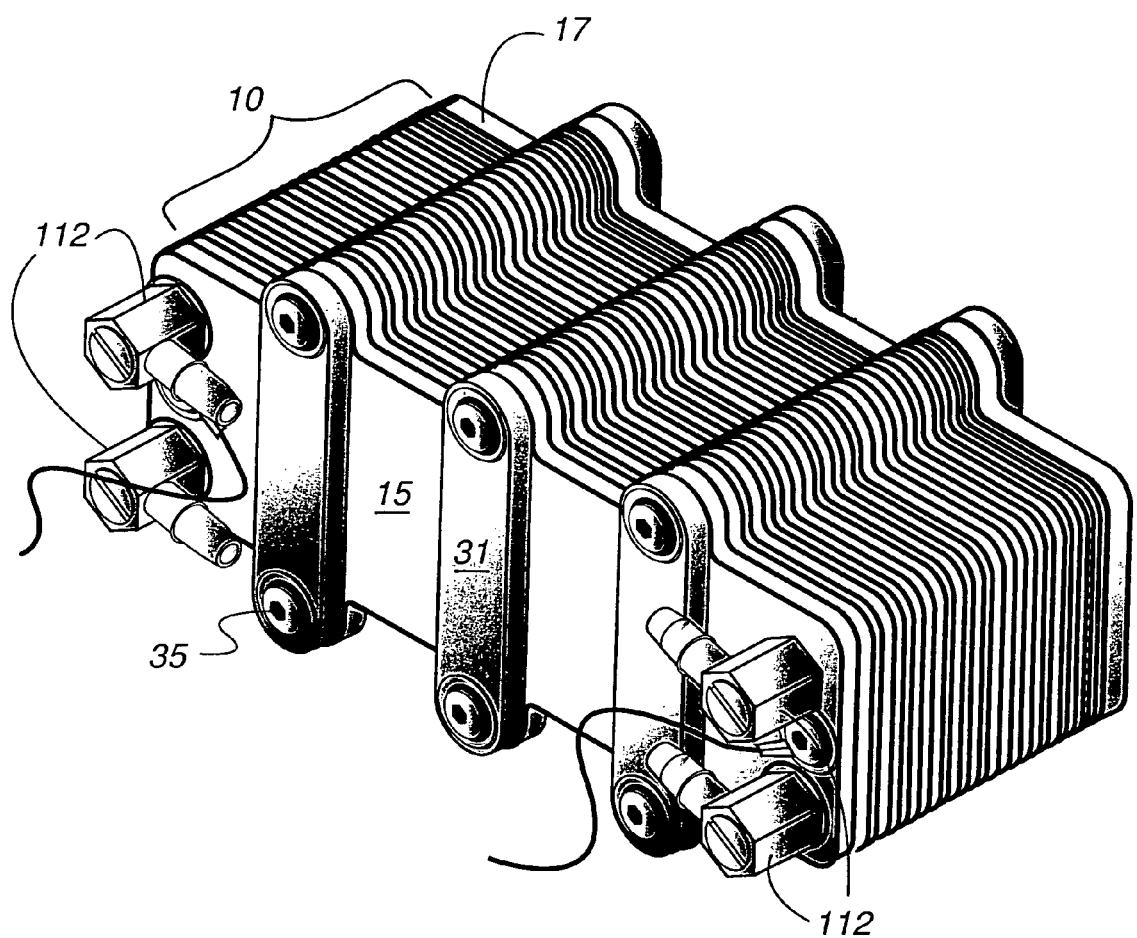
FIG. 1 is a pictorial illustration of one embodiment of the high power density methanol fuel cell stack.

The primary elements comprising the present invention shown in FIG. 1 are: 1) bipolar plates and corresponding reactant flow-fields; 2) gas/reactant diffusion layers or "backings"; 3) catalyzed membranes or membrane/electrode assemblies (MEAs); and, 4) end-plates. Note the labels within FIG. 1 correspond to those detailed in the figure descriptions that follow. Some features of the present invention, e.g., selection of anode and cathode backing materials, improved dimensional tolerances, and improved flow-field designs, provide improved performance and stability for operation with dilute liquid methanol feed and non-humidified reactant air, low reactant pressure and low air-supply stoichiometry.

Other features, like flow-field and gasket designs and use of inserts to isolate reactant channels in the seal region, improve ease of fabrication, durability of the components, and uniformity of cell operation within the stack. Lastly, component features, e.g., use of carbon paper backings, thinner bipolar plates, multifunctional endplates, and improved dimensional tolerances, enable reduction in stack size and weight.

Bipolar Plate/Flow-Field Design

Figure 2A:
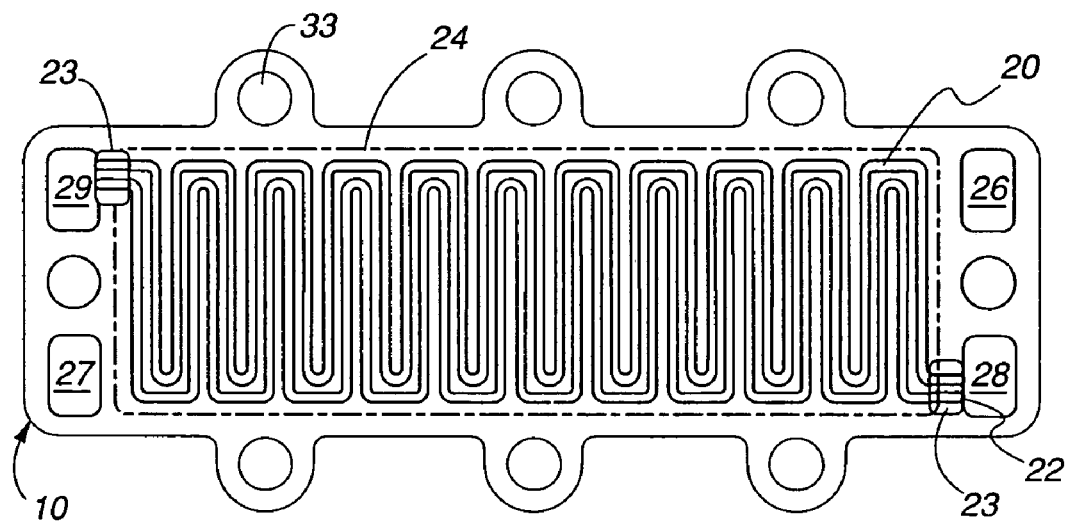
FIGS. 2a, 2b, and 2c are plan views of the present invention bipolar plate design.
Figure 2B:
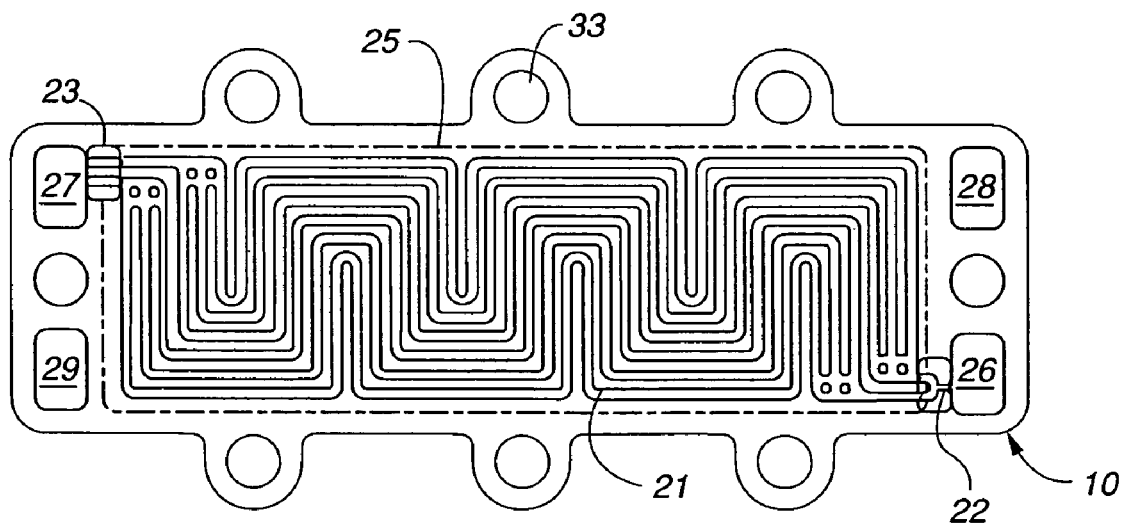

Referring now to FIGS. 2a and 2b, FIG. 2a shows the anode side of bipolar plate 10. FIG. 2b shows the cathode side of bipolar plate 10. Bipolar plates 10 are rectangular in shape to simplify integration into compact, low profile power generation systems. Tie-bolt penetrations 33 are spaced evenly around the perimeter to accommodate the tie-bolts and maintain alignment. Flow-field anode channels 20, for conveying liquid methanol fuel, and cathode channels 21, for conveying ambient air, are formed into bipolar plates 10, defining active areas 24, 25, respectively. The configurations and dimensions of flow-field channels 20, 21 are chosen in an attempt to achieve the best cell-to-cell reactant distribution possible with a minimal total pressure drop in order to reduce potential parasitic power losses.

Figure 3A:
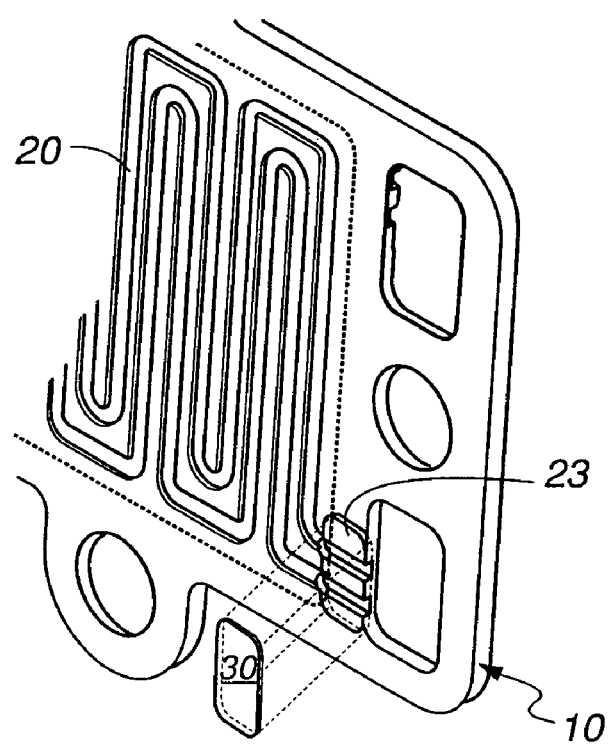
FIGS. 3a and 3b are isometric illustrations of the inlet manifolds for the flow channels within the bipolar plate.

In one embodiment, the flow field configurations of anode channels 20 and cathode channels 21 differ significantly from one another. Referring to FIGS. 2a and 3a, anode channels 20 are in a twin-channel serpentine arrangement. In a preferred embodiment, the physical characteristics of anode channels 20 are: 0.889 mm (0.035") wide, separated by ribs that are 0.94 mm (0.037") wide, with a depth of 0.25 mm (0.010"). However, the depth may range anywhere from 0.076 mm (0.003") up, depending on the thickness of the bipolar plate.

The choice of twin serpentine channels for anode channels 20 is important, since a single long serpentine channel would result in large anode pressure drops and an increased anode feed pump (not shown) load that is parasitic to the overall system. If too many parallel flow channels are used in the anode flow-field, performance deficiencies can result from the inability of the fluid flow to remove carbon dioxide bubbles that may accumulate in parts of channels 20.

For instance, if a six-channel serpentine arrangement were used for anode channels 20 (similar to that used for cathode channels 21), the large amounts of $CO_2$ formed could easily blind a region several channels wide, which denies the relatively small amount of liquid reactant supplied access to the heart of that particular region of the catalyzed membrane (refer to FIG. 4—catalyzed membrane 60) and ultimately causes a loss in cell/stack performance. However, if only two channels are used, the majority of flow tends to oscillate between the two channels to periodically replenish the fuel held in the gas diffusion layer. Even if one channel is blocked for some time, permeation of liquid reactant from the neighboring channel through the gas diffusion layer prevents an excessive loss of current.

Figure 3B:
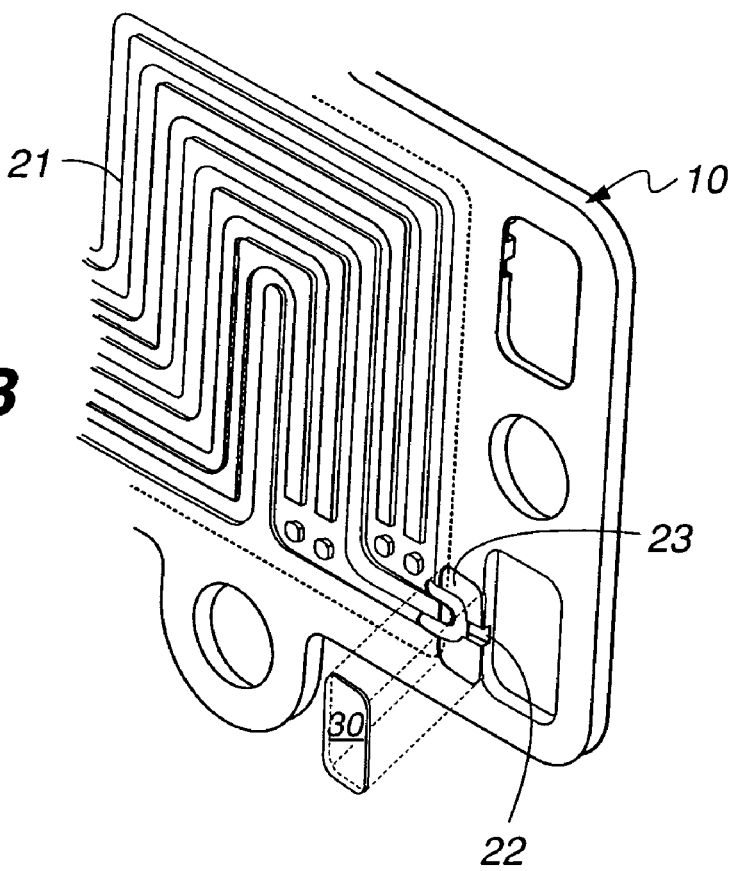

Referring to FIGS. 2b and 3b, cathode flow-field channels 21 are downstream of cathode flow restrictor 22, which is a narrow inlet channel that introduces an appreciable air pressure drop. The higher and stable pressure drop provided by restrictor 22 at the inlet of channels 21, in series with the low but variable pressure drop of cathode flow-field channels 21 serves to lessen the effects of the pressure variations on the total cell ambient air pressure drop.

The air pressure drop across channels 21 tends to vary depending upon water accumulation in active area 25, whereas the flow through restrictor 22 is liquid-free and stable. The greater the ratio of the restrictor pressure drop to the flow-field pressure drop, the less effect water-induced perturbations in the flow-field pressure drop have on the amount of reactant flow through the unit cell.

Thus, with a high-pressure drop ratio, each cell is assured of a roughly equal supply of reactant even if some tend to vary (e.g., flood) more than others. In contrast, if the pressure drop ratio is low or zero (no restrictor), the pressure variations may significantly affect pressure drop across the cells and the corresponding flow distributions to the individual cells will vary accordingly. In the worst case, a cell may become flooded to an extent that the pressure drop across the cell (inlet 26 to outlet 27) is not sufficient to dislodge the accumulated water, and the unit cell ceases to operate.

While a high-pressure drop ratio is desirable as described above, a low total pressure drop across restrictor 22 and channels 21 is also desirable to minimize the amount of power required to compress the reactant air supply. Thus, through optimizing the pressure drops of restrictor 22 and channels 21, the total cathode pressure drop can be kept reasonably low, while still attaining a pressure drop ratio that assures uniform cell-to-cell reactant distribution.

Figure 2C:
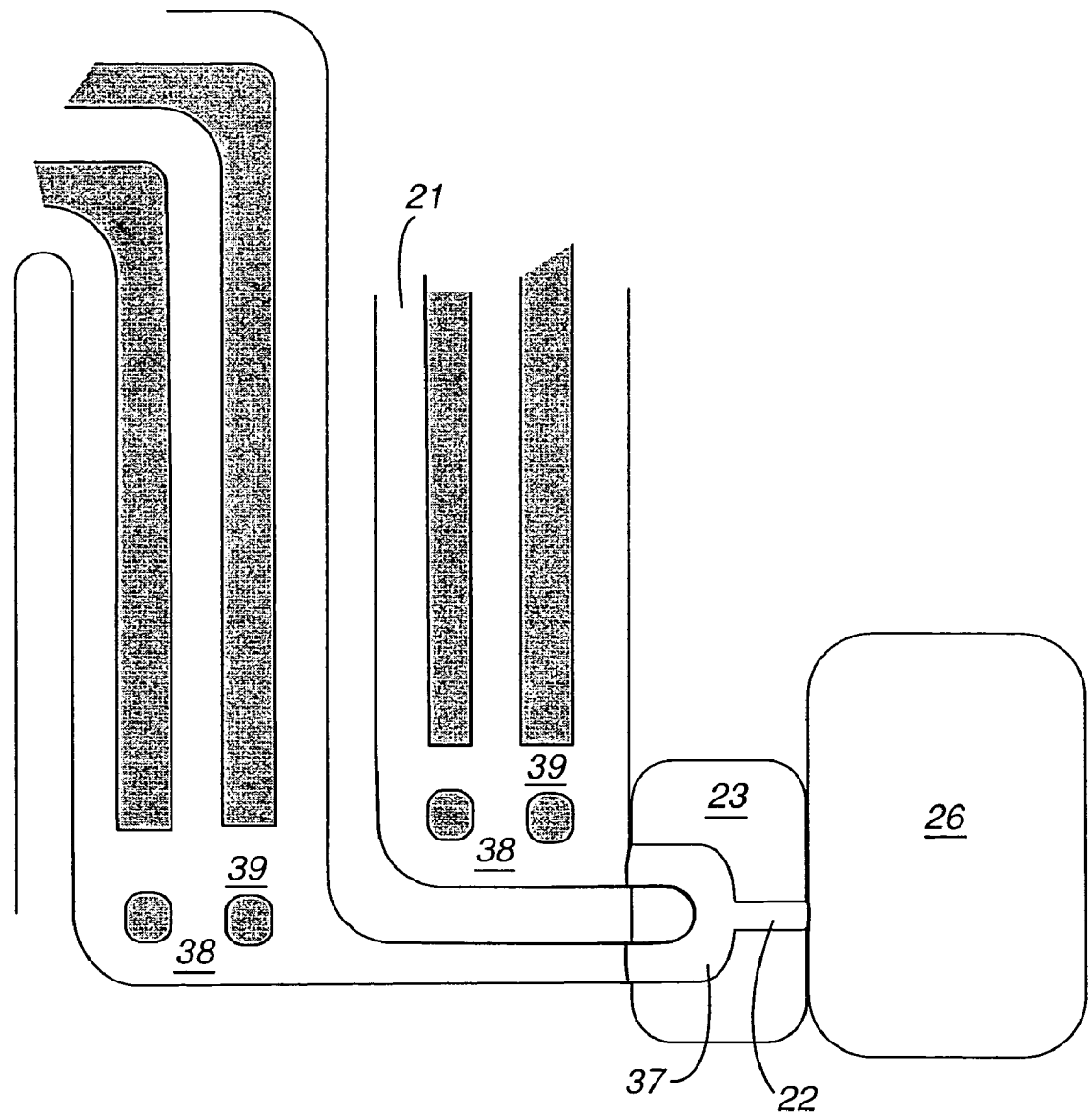

Referring now to FIG. 2c, the compact nature of this embodiment necessitates a simple, compact feature to distribute the flow downstream of cathode air restrictor 22 to multiple flow channels 21. This is accomplished by first splitting the flow into two channels just downstream of restrictor 22 in a region referred to as outer separation manifold 37, and then further splitting those two channels into two three-channel bundles in the inner separation manifold 38. In order to eliminate any flow differential resulting from pressure gradients within inner separation manifold 38, a pressure equalization channel 39 was formed slightly downstream across the three channels. The distance between the inner separation manifold 38 and pressure equalization channel 39 is 0.94 mm (0.037") to ensure that backing 50 (Refer to FIG. 4) that is in contact with this region has ample structural support and will not intrude into flow channels 21. These same features are used to re-combine the flow prior to cathode outlet manifold 27 (FIG. 2b).

A resulting benefit derived from a uniform reactant distribution is that the cathode stoichiometric ratio can be lowered, while maintaining cell performance. Thus, even if a slightly higher air operating pressure is incurred with a restrictor, less air needs to be compressed and the compressor workload is decreased, and the overall fuel cell system becomes more efficient.

In comparison, in another embodiment, a twin-serpentine flow-field was used for cathode flow-field channels 21 (similar to those discussed for anode channels 20). However, in this embodiment, the twin-serpentine flow-field created a large pressure drop and consequently a restrictor could not be used and still achieve a reasonable total pressure drop. Without a restrictor, the aforementioned pressure drop ratio was zero. As expected, performance was erratic and required high stoichiometric flows, yet certain cells would still tend to under perform. Even though the stack shared many of the same design features and had a roughly similar total pressure drop, it did not have the benefit of an optimized restrictor/flow-field combination to prevent water accumulation from affecting reactant distribution.

In designing other embodiments for cathode channels 21, desired pressure drops at a particular flowrate are chosen for channels 21 and restrictor 22, and then depth, width, and the number of channels operating in parallel are all adjusted to achieved the desired pressure drop characteristics. In one embodiment, cathode channels 21 are 0.889 mm (0.035") wide and separated by ribs 0.94 mm (0.037") wide. The depth of channels 21 is 0.25 mm (0.010"). As with the anode flow-field, the depth of these channels for the preferred embodiment is 0.25 mm (0.010"), but this may range anywhere from 0.076 mm (0.003") and up, depending on the thickness of the bipolar plate.

In one embodiment, cathode flow restrictor 22 dimensions are 0.5 mm (0.020") wide, 0.2 mm (0.008") deep, and 1.27 mm (0.050") long. These dimensions can range as much as a factor of 10. Note that the air pressure drop ratio between the restrictor 22 and channels 21 varies depending on reactant flow rate. Consequently, the design of the restrictor/flow-field dimensions must allow for the anticipated range of reactant flows.

Embodiments that employ carbon cloth diffusion layer materials require high compressive forces (up to 500 psi) to achieve good interfacial resistance characteristics with catalyzed membrane 60 (refer to FIG. 4) and bipolar plate 10. Under these compressive loads, the soft cloth extrudes into the flow-field paths, creating a partial blockage, or occlusion, of that path. As such, the flow paths themselves must be deeper to accommodate the intrusion without suffering excessively high-pressure drops.

Rigid diffusion layers require much less compressive force to achieve acceptable interfacial resistance. Under this lessened compressive force, the rigid materials do no occlude the flow paths, and thus shallower channels can be used. The use of carbon paper material as the reactant diffusion layer allows the use of thinner bipolar plates [0.38 mm (0.015")–3.18 mm (0.125")] than a cloth diffusion layer embodiment.

Also shown in FIGS. 2a and 2b are small depressions 23 represented by small rectangles in the area where flow-field channels 20, 21 connect to manifold inlets 26, 28 and outlets 27, 29, respectively. FIGS. 3a and 3b are a magnified view of bipolar plate 10 detailing small depression 23. Thin (0.127 mm (0.005")) inserts 30 comprise a rigid material that prevent the edges of a diffusion backing or the relatively soft gasket material from extruding into channels 20, 21 at these points. Thin inserts 30 also apply pressure against the gasket on the other side of the membrane to assure a seal between the opposing reactant and the manifold penetration.

In order to accommodate insert 30 and not decrease the flow cross-section, the channels may be formed deeper in this region. This added depth can range from the thickness of the insert 30 material up to nearly the thickness of the bipolar plate, restricted only by the necessity of maintaining impermeability and structural integrity of the bipolar plate. A preferred material composition of thin inserts 30 is a fiberglass reinforced resin material (e.g., NEMA G-10).

In one embodiment, impregnated graphite-based materials (gas and liquid impermeable) are used for bipolar plates 10. The carbon-based systems are chosen for their corrosion resistance and electrochemical interface stability compared to the metal-based options that are readily available. Appropriate carbon materials are graphite composites, impregnated pyrolyzed graphites, and resin-filled graphitic papers or cloths. In one embodiment, bipolar plate 10 material comprises Poco AXF-5QCF, manufactured by Poco Graphite Inc. While the flow-fields of this invention have been machined to date, moldable composites have the potential virtue of providing a very inexpensive bipolar plate.

Gas Diffusion Layers ("Backings") and Seals

Figure 4:
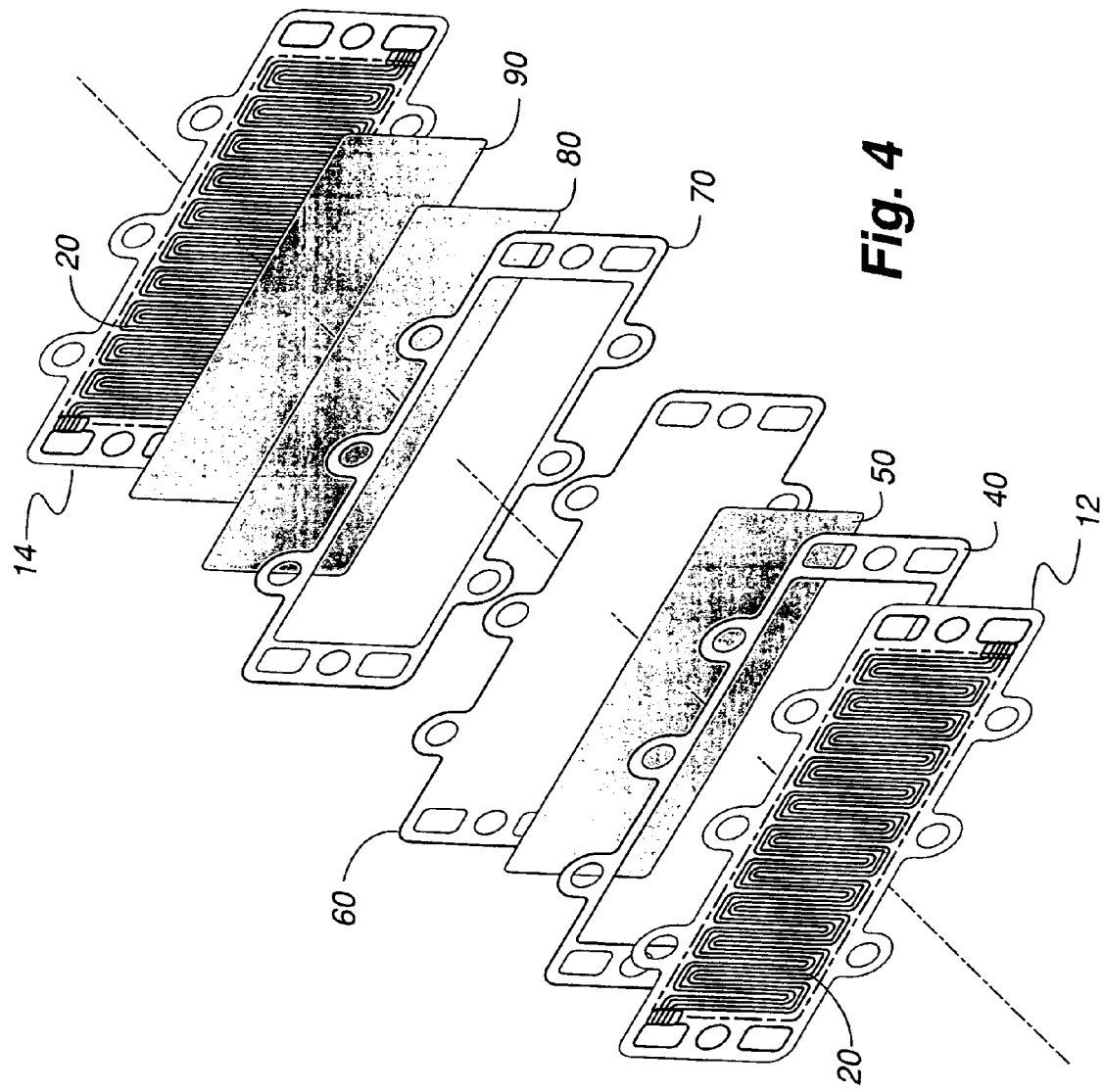
FIG. 4 is an exploded view of a unit cell assembly and bipolar plates of the present invention.

Referring to FIG. 4, one embodiment of a unit cell has first bipolar plate 12 with the cathode side facing the anode side of second bipolar plate 14. Placed between plates 12, 14 is an active region, comprising cathode gasket 40, cathode gas diffusion layer (or "backing") 50, catalyzed polymer electrolyte membrane 60, anode gasket 70, anode microporous film layer 80, and anode gas diffusion layer 90.

Cathode gas diffusion layer 50 and anode gas diffusion layer 90, provide the interface between flow-fields 20, 21 and catalyst membrane 60. In one embodiment, carbon paper backings are utilized for layers 50, 90, providing significantly better voltages at higher current density ranges (greater than 0.05 A/cm$^2$). Carbon papers are relatively rigid thin structures formed by pyrolyzing a binder-reinforced non-woven carbon fiber paper. The primary suppliers of carbon papers for backings are Spectracarb, Toray and SGL. Carbon papers can be modified in a variety of ways such as impregnation with Teflon™ or a microporous adlayer can be applied to one face. The microporous adlayer is a hydrophobic structure with sub-micron pores, preferably thinner than 100 microns. The microporous adlayer is used to maintain open pathways for the reactants at the interface of backing 50 and catalyzed membrane 60.

Additionally, free-standing microporous film 80 can be positioned against one face of uncoated paper backing 90 to serve the function of a hydrophobic adlayer. Freestanding microporous films such as the Carbel "MP" series are available from W.L. Gore & Assoc. In one embodiment for anode backing film/paper (80/90) combination, a hydrophilic paper (either untreated or lightly treated with polysulfone binder for structural improvements) in conjunction with a Carbel "MP" series microporous film is used.

The hydrophilic paper provides ready access of the reactant liquid to the close proximity of the catalyst layer and the microporous film helps protect the catalyst layer from dissolution and alleviates the effects of gas blinding by the evolved carbon dioxide. In one embodiment for cathode gas diffusion layer 50, SGL 30DC is used (manufactured by SGL Technologies GmbH), which is approximately 20-wt % Teflon-treated carbon paper with a carbon adlayer, serving as a microporous layer, on the side facing towards catalyzed membrane 60.

Given the good dimensional stability and repeatability of the diffusion layers and bipolar plates, gasket materials may be chosen that do not need to accommodate a very wide range of potential gaps. As such, anode gasket 70, in one embodiment, is a polyurethane foam on a Polyethylene Terphalate (PET) carrier (i.e., rigid film), also from Rogers-Bisco, that is relatively firm compared to silicone foam, and significantly thinner, at only 0.3 mm (0.012"). Cathode gasket 40, in one embodiment, is the same polyurethane foam material, but with no PET carrier, with a thickness of 0.43 mm (0.017"). As a result of this gasket material choice, extrusion and/or creep of gasket material into the reactant manifolds is minimal compared with the material used in the cloth backing embodiment, and much tighter tolerances are achieved between gaskets 40, 70 and layers 50, 90. Also, the sealing characteristics of gaskets made up of these materials are superior over those used in a cloth embodiment.

Fuel Cell Stack Design

Figure 5:
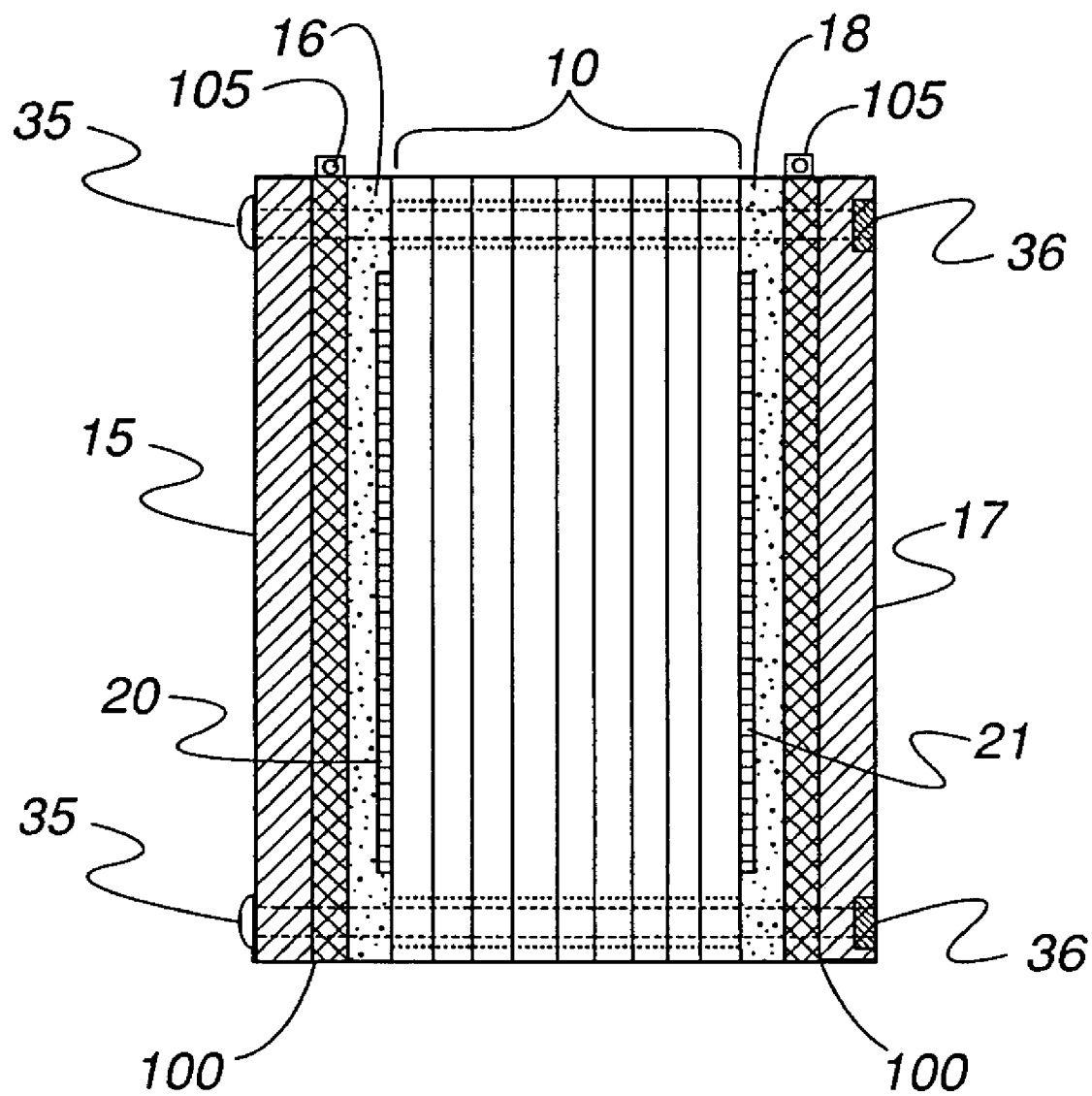
FIG. 5 is a side view of one embodiment of the present invention fuel cell stack design.

Referring now to FIG. 5, rectangular bipolar plates 10 are sandwiched in-between rectangular uni-polar plates 16, 18. Uni-polar plates 16, 18 are identical to bipolar plates 10 except that channels 20, 21 defining active areas 25, 26 (FIGS. 2a, 2b) exist only on the side facing bipolar plates 10. Thus, uni-polar plate 16 and next bipolar plate 10 comprise the first fuel cell on one end of the fuel cell stack. Current collector plates 100 are placed in-between uni-polar plates 16, 18 and endplates 15, 17.

In one embodiment, current collector plate 100 may be made from stainless steel, although gold-coated copper is often used to minimize contact resistances and to resist corrosion. Other highly conductive materials, such as impregnated graphite, may also be used as current collectors. Collector plate 100 may include perforated square tab projections 105 for current and voltage taps. Thus, either spade terminals may be slipped on, or ring terminals bolted on, to affix the current leads to current collector plate 100.

Figure 6:
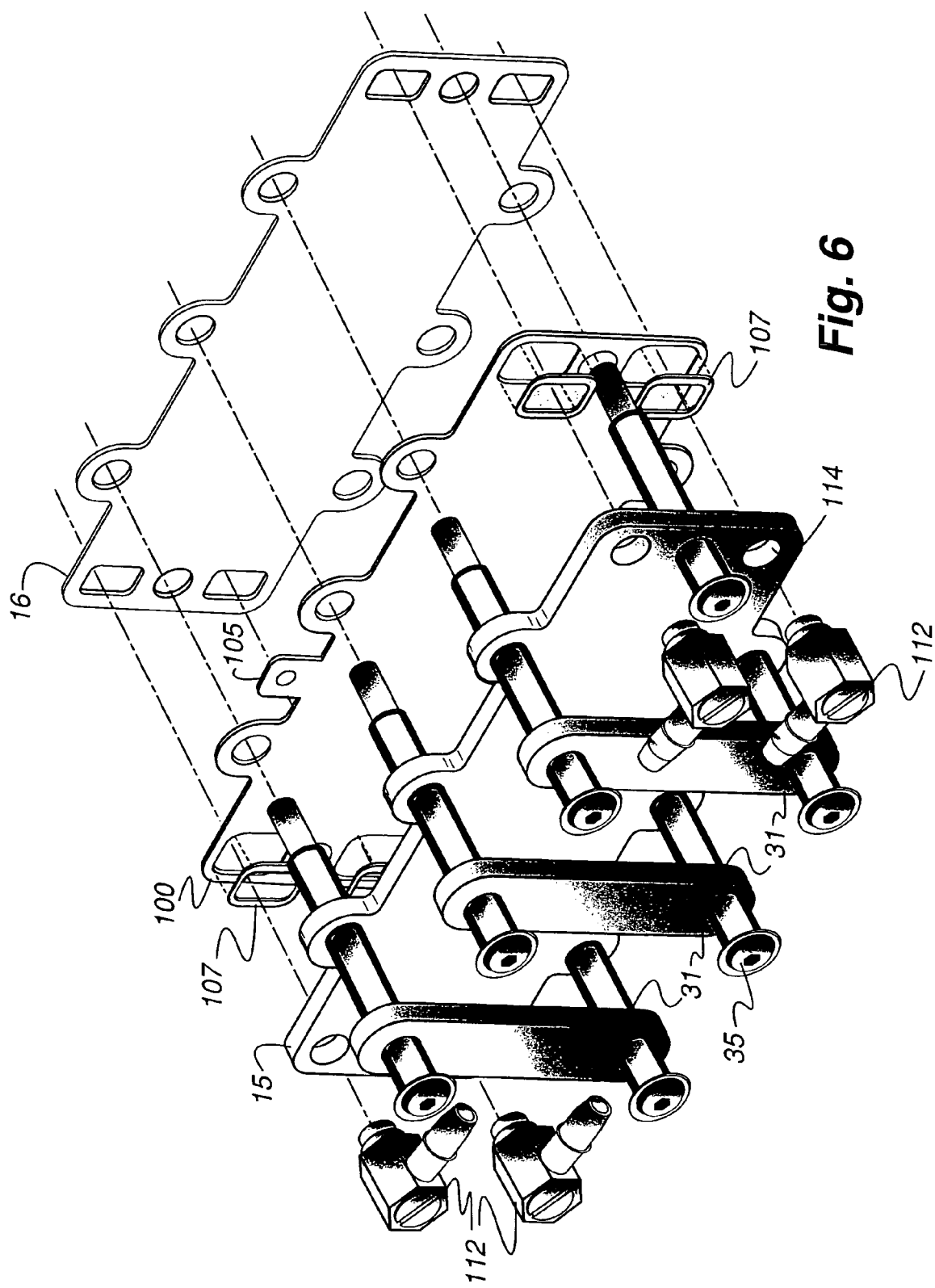
FIG. 6 is an exploded view of one end of a fuel cell stack, featuring fittings, tie-bolts and plates, and seals.

Referring to FIGS. 6, which depicts an exploded view of an embodiment portrayed in FIG. 5, the thickness of current collector plate 100, which may vary from as little as 0.127 mm (0.005") to as much as 3.175 mm (0.125"), and is chosen to allow sufficient compression of endplate seals 107 to provide an effective seal. For example, in one embodiment, 0.64 mm (0.025") thick collector plates are used in conjunction with 0.81 mm (0.032") thick endplate seals. Endplate seals 107 fit within current collector plate 100, serving to isolate the reactant flows from current collector plate 100, so that corrosion is not an issue with embodiments using metal for current collectors 100.

Connectors 112 for reactant lines are provided via ports 114 through endplates 15,17 and are tapped for threaded fittings. The reactant flows pass through endplates 15, 17 and current collector plates 100 to distribution manifolds created by aligning ports 114 within the stacked assembly of bipolar plates 10, uni-polar plates 16,18 and endplates 15, 17.

Endplates 15,17 are used to "tie" the fuel cell stack together, and, therefore, must be able to provide the compression needed without undue deflection in order to enable the optimum electrical connectivity between all the interfaces within a single cell or stack. Tie-bolts 35 and corresponding nuts 36 (FIG. 5) are used to provide the proper compression. The compression forces in polymer electrolyte fuel cells (PEFCs) are particularly high, as 300 psi (20 atm) levels are not uncommon, especially with cloth backings. Further, the endplate assembly provides reactant connections to the manifolds and some means of current collection.

In one embodiment, endplates 15,17 comprise impregnated graphite (Poco AXF-5QCF) manufactured by Poco Graphite, Inc., the same material as the bipolar plate embodiment previously described. As Poco AXF-5QCF is mechanically sound and extremely conductive, the need for stainless steel current collectors is eliminated. Poco AXF-5QCF provides adequate flexural strength at a much lower weight than metals. In another embodiment, carbon composite reinforcing plates 31 were used to mechanically reinforce endplates 15,17. This allowed the use of thin [3.175 mm (0.125")] endplates, effectively combining the material properties of strength, conductivity, corrosion tolerance, and machinability, thereby reducing the size, weight, and complexity of the fuel cell.

Figure 7:
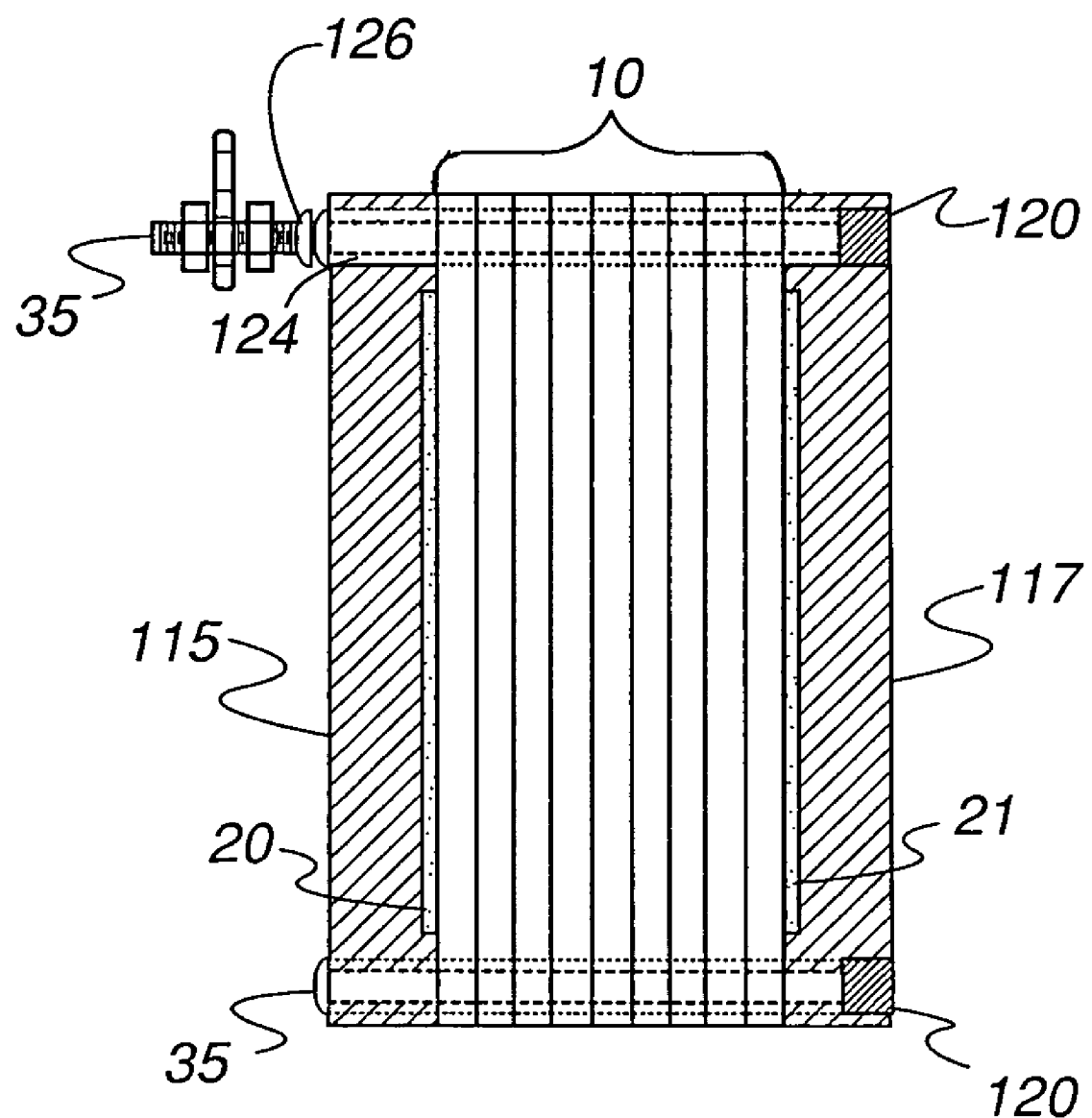
FIG. 7 is a side view of the multifunctional endplate fuel cell stack design.

FIG. 7 shows another embodiment using a multi-functional endplates 115, 117, which serve as a combined endplate, current collector, and uni-polar plate. Flow-fields 20, 21 are formed into one side of each multi-functional endplate 115,117, respectively. Threaded inserts 120, made of stainless steel or a similar material, recessed into the surface of one endplate provides a lower profile for improved packaging. Inserts 120 also electrically connect tie bolts 35 to endplates 115,117. Since multi-functional endplates 115,117 also function as current collectors, using non-conductive bolt sheaths 124 and insulator washers 126 electrically isolates tie-bolts 35.

In another embodiment, #10 fiber-reinforced plastic (NEMA G-10) bolts were used instead of metal for tie-bolts 35. For this embodiment, the multi-endplate does not require the steel threaded inserts, but may be tapped directly with threads. This reduces overall stack mass significantly, but requires that one or two of tie-bolts 35 extend past the threaded endplate to allow electrical connection to that plate (using ring terminals—not shown).

Stack Performance

Figure 8:
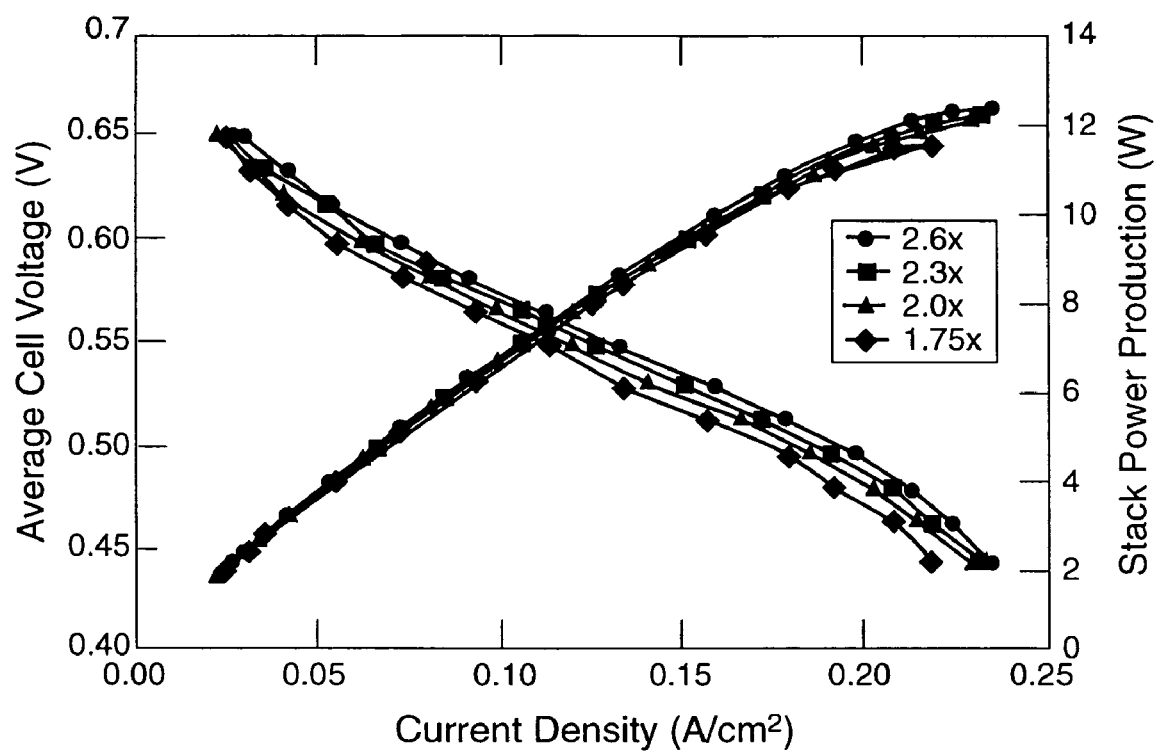
FIG. 8 graphically shows stack performance for one embodiment of the present invention fuel cell stack design

FIG. 8 shows the performance of a six-cell stack embodiment of the present invention with cathode air stoichiometric flow rates of 1.75×, 2.0×, 2.3×, and 2.6×. On average, current densities over 110 mA/cm$^2$ are attained at 0.55 V/cell for conditions of 0 psig cathode backpressure and 100 sccm/cell air feed (absolute pressure is only 0.76 atm /11.2 psia resulting from the high altitude of the testing facility). As indicated in the plot, output power was largely unaffected by the varied cathode air stoichiometric flow rates. As such, a power production system utilizing this design could utilize a smaller, lower-power cathode air pump without sacrificing overall stack output. Due to the uniform performance of the six individual cells, this average stack performance is very close to that obtained for single-cells.

The six-cell performance results are for a embodiment comprising: anodes backed with untreated Toray carbon 0.20 mm (0.0080") thick combined with a Carbel MP microporous layer, a cathode backed with 0.25 mm (0.010") thick SGL 30DC carbon paper material, and where the flow-fields were as discussed previously with 0.89 mm (0.035") wide and 0.25 mm (0.010") deep channels.

This six-cell performance is indicative of the performance that may be expected at the target 25-cell stack level. Typically, a performance loss is incurred when placing cells into a stack, but this loss has been mitigated in this stack embodiment by using a cathode flow-restrictor and a properly designed cathode flow-field. Combining all the aforementioned improvements yields a stack design that not only performs well, but also provides significant increases in power density over historical stack designs. By projecting these and other six-cell stack results to a 25-cell stack, it is anticipated that this design is capable of achieving power densities of 350 W/kg or greater under certain conditions (72° C., 1.0 M MeOH, 3.0× air stoichiometric flow rate at 0 psig back pressure).

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A stack of direct methanol fuel cells, comprising:
    (a) at least one direct methanol fuel cell,
    (b) a cathode manifold to convey ambient air,
    (c) an anode manifold to convey liquid methanol fuel, and
    (d) said at least one direct methanol fuel cell comprising:
        a first graphite-based material plate with a cathode active area defined by first serpentine channels connecting a cathode manifold inlet with an integral flow restrictor to a cathode manifold outlet,
        a second graphite-based material plate with an anode active area defined by second serpentine channels connecting an anode manifold inlet to an anode manifold outlet, and
        an active region between said cathode active area and said anode active area.

2. The apparatus of claim 1 where said active region comprises in the following order: a cathode gasket, a cathode gas diffusion layer, a catalyzed polymer electrolyte membrane, an anode gasket, an anode microporous film layer, and an anode diffusion layer.

3. The apparatus of claim 2 where said cathode gasket defines tie-bolt penetrations and a first penetration further defined by said cathode active area.

4. The apparatus of claim 2 where said cathode gas diffusion layer is areally equivalent to said cathode active area.

5. The apparatus of claim 2 where said anode diffusion layer and said anode microporous film layer are areally equivalent to said anode active area.

6. The apparatus of claim 2 where said polymer electrolyte membrane includes tie-bolt penetrations.

7. The apparatus of claim 2 where said anode gasket defines tie-bolt penetrations and a second penetration further defined by said anode active area.

8. The apparatus of claim 2 where said cathode gas diffusion layer comprises a carbon cloth backing.

9. The apparatus of claim 2 where said cathode gas diffusion layer comprises carbon paper.

10. The apparatus of claim 9 where said carbon paper is treated with approximately 15 wt % perfluoropolymer and coated on one side with a microporous adlayer.

11. The apparatus of claim 2 where said anode gas diffusion layer comprises a carbon cloth backing.

12. The apparatus of claim 2 where said anode gas diffusion layer comprises carbon paper.

13. The apparatus of claim 2 where said cathode gasket comprises polyurethane foam and polyester film.

14. The apparatus of claim 2 where said anode gasket comprises polyurethane foam and polyester film.

15. The apparatus of claim 1 further comprising a first endplate located on a first end of said at least one direct methanol fuel cell and a second endplate located on a second end of said at least one direct methanol fuel cell, where said at least one direct methanol fuel cell is positioned therebetween.

16. The apparatus of claim 15 further comprising a first current collector, located between said first endplate and said at least one direct methanol fuel cell and a second current collector, located between said second endplate and said at least one direct methanol fuel cell.

17. The apparatus of claim 15 where said first and second endplates material is selected from the group consisting of: carbon-fiber, resin composite, steel, or silicon-carbide.

18. The apparatus of claim 15 further including reinforcing plates to mechanically reinforce said first and second endplates.

19. The apparatus of claim 18 where said reinforcing plates comprise a carbon composite.

20. The apparatus of claim 1 further comprising small depressions located where said first serpentine channels intersect with said cathode manifold inlet and outlet, and where said second serpentine channels intersect with said anode manifold inlet and outlet, and a thin insert of a rigid material placed within said small depressions that prevents obstruction of said first and second serpentine channels.

21. The apparatus of claim 20 where said rigid material comprises a fiberglass reinforced resin.

22. The apparatus of claim 1 where said first serpentine channels include an outer separation manifold, an inner separation manifold, and at least one pressure equalization channel to reduce flow differential resulting from pressure gradients within said inner separation manifold.

23. The apparatus of claim 1 where said graphite-based material is selected from the group consisting of: graphite composites, impregnated pyrolyzed graphites, resin-filled graphitic paper, and moldable graphite composite.

24. The apparatus of claim 1 further comprising a first multi-functional endplate located on a first end of said at least one direct methanol fuel cell and a second multi-functional endplate located on a second end of said at least one direct methanol fuel cell, where said at least one direct methanol fuel cell is positioned therebetween.

25. The apparatus of claim 24 where said first and second multi-functional endplates are a carbon-carbon composite material.

26. The apparatus of claim 24 where said first and second multi-functional endplates are a graphite plate material.

27. The apparatus of claim 1 comprising a plurality of said at least one direct methanol fuel cell.

* * * * *